United States Patent
Tseng

(10) Patent No.: US 8,406,345 B2
(45) Date of Patent: *Mar. 26, 2013

(54) METHOD AND DEVICE FOR AQUIRING A CHANNEL WITH FREQUENCY OFFSET LESS THAN HALF SYMBOL RATE

(75) Inventor: Chun-Chieh Tseng, Gueishan Township, Taoyuan County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 233 days.

This patent is subject to a terminal disclaimer.

(21) Appl. No.: 12/926,298

(22) Filed: Nov. 9, 2010

(65) Prior Publication Data

US 2011/0129045 A1    Jun. 2, 2011

(30) Foreign Application Priority Data

Nov. 27, 2009    (TW) ................................. 98140559 A

(51) Int. Cl.
 *H04L 27/00* (2006.01)
(52) U.S. Cl. ....................................................... 375/326
(58) Field of Classification Search .................... 375/343
See application file for complete search history.

(56) References Cited

U.S. PATENT DOCUMENTS

| | | | | |
|---|---|---|---|---|
| 4,941,155 A * | 7/1990 | Chuang et al. | ................. | 375/330 |
| 5,995,563 A * | 11/1999 | Ben-Efraim et al. | ......... | 375/344 |
| 7,778,336 B1 * | 8/2010 | Toumpakaris et al. | ....... | 375/260 |
| 2005/0227626 A1 * | 10/2005 | Stoddard et al. | ........... | 455/67.11 |
| 2006/0093070 A1 * | 5/2006 | Ibrahim et al. | ................. | 375/324 |
| 2007/0098089 A1 * | 5/2007 | Li et al. | .......................... | 375/260 |
| 2008/0095249 A1 * | 4/2008 | Yoon et al. | ..................... | 375/260 |
| 2009/0154613 A1 * | 6/2009 | Lai | ................................. | 375/344 |
| 2009/0323793 A1 * | 12/2009 | Chang et al. | ................... | 375/226 |
| 2010/0239053 A1 * | 9/2010 | Cahn et al. | ..................... | 375/342 |
| 2010/0260294 A1 * | 10/2010 | Zhengang et al. | ............ | 375/343 |
| 2011/0135042 A1 * | 6/2011 | Tseng et al. | .................... | 375/344 |
| 2012/0163504 A1 * | 6/2012 | Nemeth et al. | ................ | 375/319 |

FOREIGN PATENT DOCUMENTS

WO    WO2010057975 A2 *    5/2010

OTHER PUBLICATIONS

Evren Terzi, "Blind syncronization and detection of Nyquist pulse shaped QAM signals", Jun. 1, 2009, Graduate School Theses and Disserations, Paper 48, pp. 1-58.*

* cited by examiner

*Primary Examiner* — David C. Payne
*Assistant Examiner* — Michelle M Koeth
(74) *Attorney, Agent, or Firm* — Bacon & Thomas, PLLC

(57) ABSTRACT

A method and device for acquiring a channel with a frequency offset less than half symbol rate is applied but not limited to a DVB-S system. A target channel is selected to obtain a carrier frequency and a symbol rate for programming a tuner to obtain a digital baseband signal. A down-sampling factor is calculated based on the symbol rate for performing a down-sampling operation to obtain a down-sampling signal that passes through a digital matched filter to generate a filtered spectrum. A moving average and spectrum inversion is applied to detect location of the target channel and find two cross points thereby estimating a coarse carrier frequency offset for compensating the tuner and a coarse symbol rate. A fine carrier frequency offset and a symbol rate estimate are estimated for compensating and acquiring the target channel when the target channel is successfully detected.

10 Claims, 10 Drawing Sheets

METHOD AND DEVICE FOR AQUIRING A CHANNEL WITH FREQUENCY OFFSET LESS THAN HALF SYMBOL RATE

BACKGROUND OF THE INVENTION

1. Field of the Invention

The present invention relates to the technical field of digital televisions and, more particularly, to a method and device for acquiring a channel with frequency offset less than half symbol rate particularly in but not limited to the Digital Video Broadcasting-Satellite (DVB-S) system.

2. Description of Related Art

In developing digital televisions, the first essential task is to establish a digital platform. In addition to pure hardware equipments such as a set-top box or television set, the digital platform needs to include digital channels and digital contents.

According to market segments, current global digital televisions are grouped and regulated by two main specifications: Advanced Television Systems Committee (ATSC) for American-based markets, and Digital Video Broadcasting (DVB) for Euro-based markets. The DVB systems can be further divided into DVB-C (Cable) for wired television applications, DVB-S (Satellite) for satellite television applications, and DVB-T (Terrestrial) for wireless television applications.

An official system provider can transmit a signal, such as DVB-S, over a satellite antenna disposed on a building through a satellite located on 22000 km and above. In this case, a quadrature phase shift keying (QPSK) is applied to transmit MPEG2 data, and all carrier frequencies and symbol rates associated with all channels of the system can be pre-stored in a receiver in order to rapidly receive the programs.

However, when the carrier frequency and symbol rate are updated, such a way is unable to receive the programs on the updated channel. Accordingly, for such a DVB-S receiver, a blind scan function is required in order to provide a simple operating mode to thereby allow a user to have an automatic program scan without knowing the programs received by a satellite in advance. Speed and accuracy are the most important factors in evaluating the performance of the blind scan. Rapid scan reduces the waiting time of the user.

A typical blind scan method is a frequency scan method controlled by a backend software. FIG. 1 is a block diagram of a typical receiver. As shown in FIG. 1, the operation principle is first to use the controller 11 for tuning the tuner 12 to a carrier frequency (CF). Next, a filter bank (not shown) and a timing recovery loop (not shown) in the baseband demodulation chip 13 are activated to operate at smallest possible symbol rate. The symbol rate is increased whenever loop does not converge. When the symbol rate is over a preset maximum and the loop cannot converge, it indicates that there is no signal at the frequency. In this case, the carrier frequency of the tuner is incremented by a pre-specified step size. Accordingly, the above process is repeated until the loop converges.

Apparently, that way has the disadvantage of very slow scan speed. Since the possible symbol rate may be diversified in a very wide range, such as from 1 M to 45 M bauds in DVB-S system, and a satellite signal occupies a quite wide spectrum, such as an input range from 950 MHz to 2150 MHz for a Ku/C band tuner, the combination produces numerous possibilities. Accordingly, it spends long time to complete a blind scan procedure. In addition, it takes much time to change the carrier frequency of the tuner, which further prolongs the scan time. Moreover, as the convergence of the timing recovery loop is quite slow, speed of loop-scanning the symbol rate by this method is quite limited. Therefore, the typical frequency scan method is extremely slow.

In practical situation, validness of the channel parameters may change with time. Channel acquisition based on the pre-stored parameters in the receiver may fail. Besides, as the carrier frequency and the symbol rate produced by the blind scan method is limited by the used algorithms and the carrier frequency step resolution of a tuner, the resulted carrier frequency offset (CFO) by the blind scan method can be large for channel acquisition. Hence, the carrier frequency and symbol rate obtained by the typical pre-store based or blind scan method requires a further recognition. Improvement on channel parameter acquisition is required.

Therefore, it is desirable to provide an improved simple method and device for acquiring a channel with frequency offset, so as to mitigate and/or obviate the aforementioned problems.

SUMMARY OF THE INVENTION

The object of the present invention is to provide a simple method and device for acquiring a channel with frequency offset less than half symbol rate, which can provide more accurate channel parameters and overcome the incorrect carrier frequency caused by the blind scan or pre-store method in the prior art. The symbol rate is considered accurate throughout this disclosure. The method and device can be applied but not limited to a DVB-based system.

According to a feature of the invention, a method for acquiring a channel with a frequency offset less than half symbol rate is provided, which is applied but not limited to a DVB-S system. The method includes the steps of: (A) selecting a target channel; (B) acquiring a carrier frequency and symbol rate of the target channel; (C) tuning a tuner according to the carrier frequency so as to obtain a digital baseband signal corresponding to the target channel; (D) calculating a down-sampling factor (DSF) according to the symbol rate in step (B); (E) performing a down-sampling operation on the digital baseband signal according to the down-sampling factor for further finding a spectrum of the target channel; (F) using a moving average and spectrum inversion technique to detect a position of the spectrum of the target channel and to calculate a first cross point and a second cross point of the spectrum of the target channel; (G) calculating a coarse carrier frequency offset and a coarse symbol rate according to the cross points; (H) determining whether the coarse carrier frequency offset is greater than a first threshold, and tuning and compensating the tuner based on the coarse carrier frequency offset when the coarse carrier frequency offset is greater than the first threshold, so that the spectrum of the target channel is located at a middle of a working bandwidth of the tuner to obtain a tuned digital baseband signal corresponding to the target channel; (I) calculating a fine carrier frequency offset and a symbol rate estimate for the target channel according to the tuned digital baseband signal; and (J) arranging a digital mixer based on the fine carrier frequency offset for determining whether a signal at the fine carrier frequency offset is a channel to be acquired, and arranging the digital mixer based on the fine carrier frequency offset when a signal at the fine carrier frequency offset presents, so as to locate the spectrum of the target channel in a working bandwidth of the digital mixer for acquiring data.

According to another feature of the invention, a device for acquiring a channel with a frequency offset less than half symbol rate is provided, which is applied but not limited to receiver design of a DVB-S system. The device includes a tuner, an analog to digital converter (ADC), a tuner auto-gain controller, a digital mixer, an interpolator, a digital auto-gain controller (DAGC), a digital matched filter (DMF), a spectrum computation device, a spectrum parameter extractor and a controller. The tuner receives a radio frequency (RF) signal of a target channel generated at the output of an antenna and tune the RF signal down to baseband based on an analog carrier frequency offset to thereby produce an analog baseband signal. The ADC is connected to the tuner in order to convert the analog baseband signal into a digital baseband signal. The tuner auto-gain controller (AGC) is connected to the ADC and the tuner in order to set proper signal level out of the tuner according to the digital baseband signal. The digital mixer is connected to the ADC in order to receive the digital baseband signal and use the received digital carrier frequency offset to perform a frequency shifting on the digital baseband signal to thereby produce an offset baseband signal. The interpolator is connected to the digital mixer in order to use the received down-sampling factor to perform an interpolation operation on the offset baseband signal to thereby produce an interpolated offset baseband signal. The digital AGC is connected to the interpolator in order to perform an auto-gain adjustment on the interpolated offset baseband signal to thereby produce a gained baseband signal. The digital matched filer is connected to the digital AGC in order to filter the gained baseband signal to thereby produce a filtered baseband signal. The spectrum computation device is connected to the digital matched filter in order to produce a spectrum of the filtered baseband signal according to a control signal. The spectrum parameter extractor is connected to the spectrum computation device in order to calculate a coarse frequency offset and a fine carrier frequency offset of the spectrum, a coarse symbol rate and a fine symbol rate of the digital baseband signal, and a first cross point and a second cross point of the spectrum according to the control signal. The controller is connected to the tuner, the digital mixer, the interpolator, the spectrum computation device and the spectrum parameter extractor in order to use a carrier frequency of the target channel to calculate the analog carrier frequency offset and generate the analog carrier frequency offset to the tuner, use a symbol rate of the target channel to calculate the down-sampling factor and generate the down-sampling factor to the interpolator, use the coarse carrier frequency offset of the spectrum generated by the spectrum parameter extractor to re-calculate the analog carrier frequency offset when the coarse carrier frequency offset is greater than a first threshold and use the analog carrier frequency offset re-calculated to tune the tuner, use the coarse symbol rate of the digital baseband signal generated by the spectrum parameter extractor and the cross points of the spectrum to calculate the down-sampling factor and generate the down-sampling factor to the interpolator, use the fine carrier frequency offset generated by the spectrum parameter extractor to arrange the digital mixer, and determine whether a signal at the fine carrier frequency offset is a channel to be acquired. When the signal at the fine carrier frequency offset presents, the controller arranges the digital mixer based on the fine carrier frequency offset so as to locate a spectrum of the target channel in a working bandwidth of the digital mixer for acquiring data.

The method and device uses the carrier frequencies and symbol rates of a target channel to tune the tuner and arrange the interpolator, uses the digital carrier frequency offset to arrange the digital mixer to thereby acquire a coarse carrier frequency offset, a fine carrier frequency offset, a coarse symbol rate, a fine symbol rate, and cross points of the spectrum. In addition, when the coarse carrier frequency offset is greater than a first threshold, the tuner is tuned according to the coarse carrier frequency offset to thereby locate the spectrum of the target channel in a range of the working bandwidth of the tuner and thus acquire a digital baseband signal. Further, a down-sampling factor calculated with the coarse symbol rate is applied to perform a down-sampling operation on the digital baseband signal to thereby locate the digital baseband signal at the main component of a filtered baseband signal for increasing the inband SNR and spectrum resolution of a DMF and increasing the accuracy of the fine carrier frequency offset F_CFO and fine symbol rate F_SR. Thus, the error caused by the noises of the working bandwidth of the DMF in estimation, and corresponding adjacent channel interferences in the prior art are skillfully avoided. The invention efficiently makes use of the digital mixer and digital signal processing technique to achieve the same functionality of analog mixer, which has an operating speed quicker than an analog tuner, so the time on channel parameter estimation can be effectively reduced.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
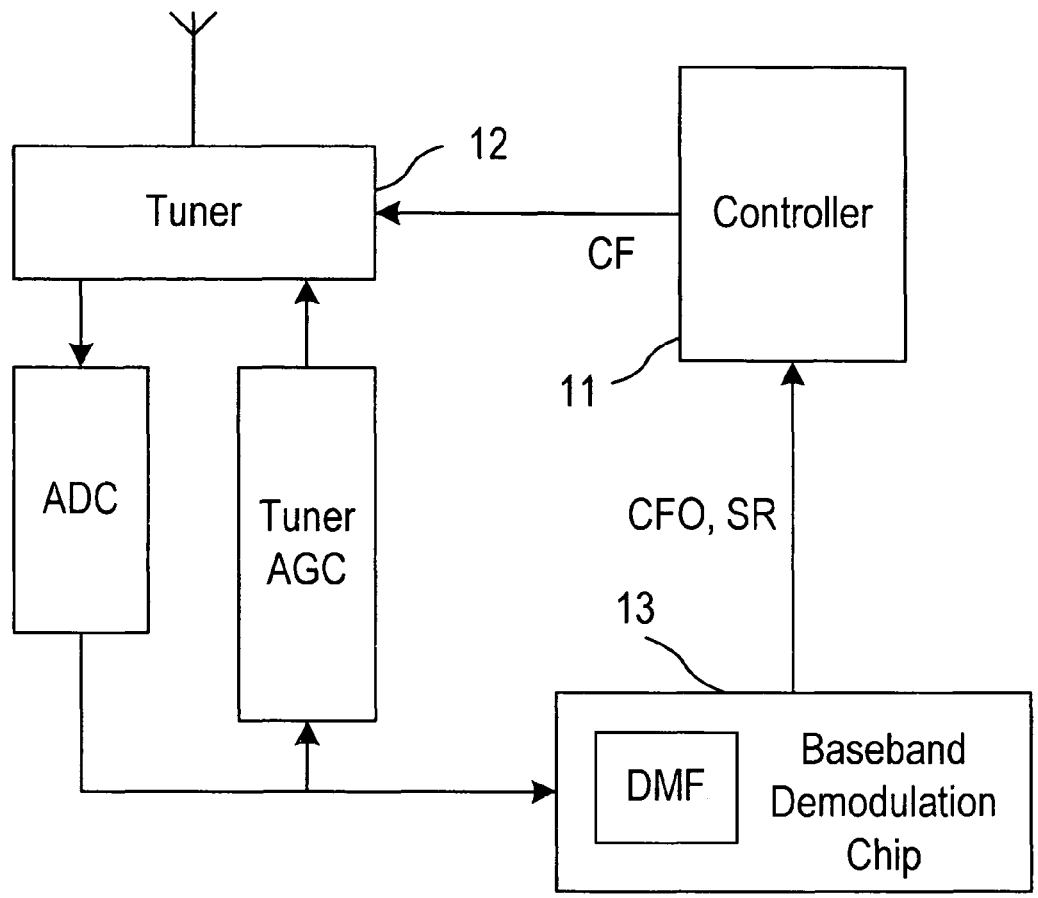
FIG. 1 is a block diagram of a typical receiver.
Figure 2:
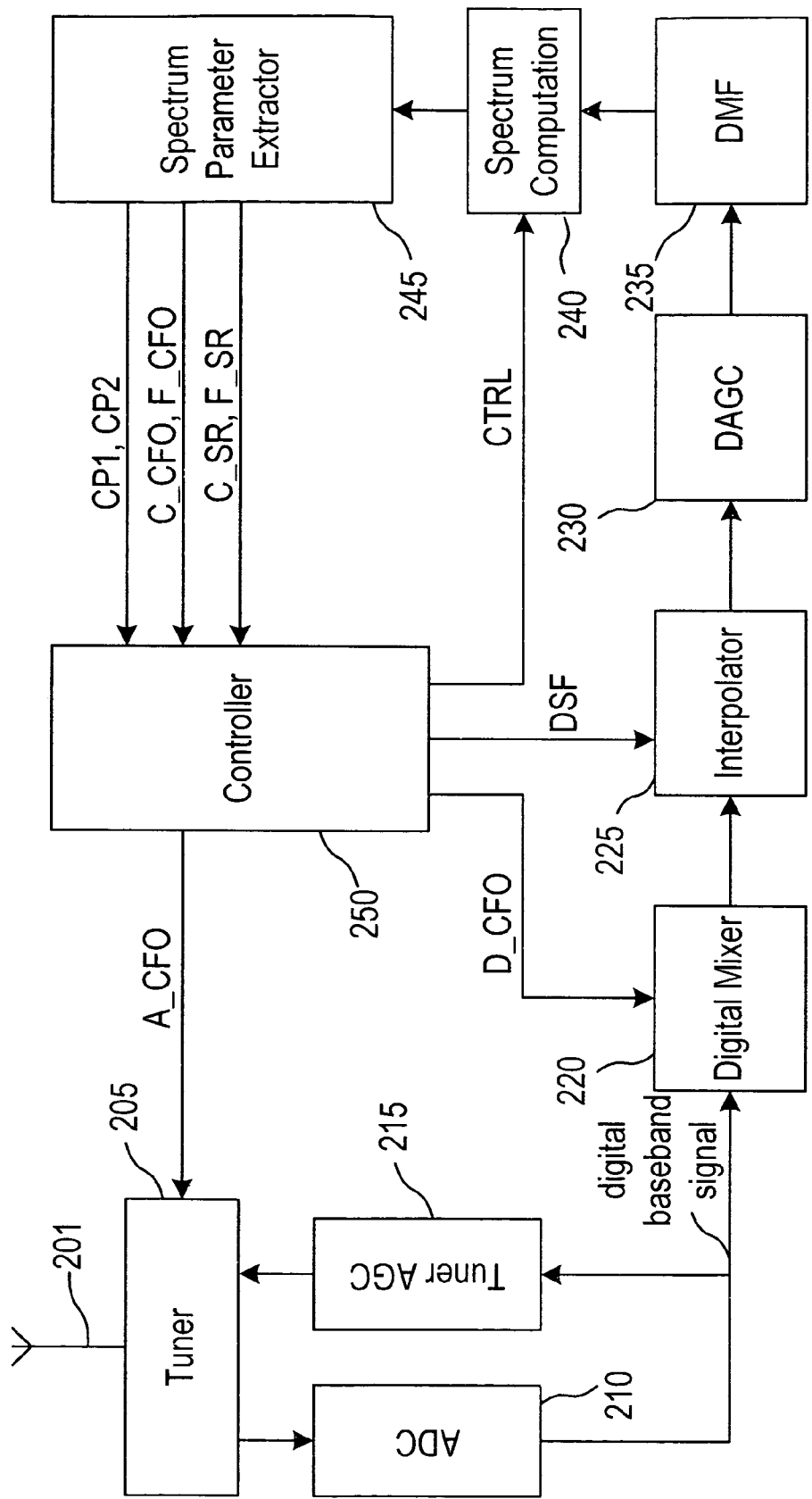
FIG. 2 is a block diagram of a device for acquiring a channel with a frequency offset less than half symbol rate according to an embodiment of the invention.

FIG. 2 is a block diagram of a device for acquiring a channel with a frequency offset less than half symbol rate according to an embodiment of the invention. The device includes a tuner 205, an analog to digital converter (ADC) 210, a tuner auto-gain controller 215, a digital mixer 220, an interpolator 225, a digital auto-gain controller (DAGC) 230, a digital matched filter (DMF) 235, a spectrum computation device 240, a spectrum parameter extractor 245 and a controller 250.

The tuner 205 is connected to the controller 250 in order to receive a radio frequency (RF) signal generated by an antenna 201, and is based on an analog carrier frequency offset A_CFO designated by the controller 250 to tune the RF signal down to a baseband to thereby produce an analog baseband signal. The tuner 205 has a channel filter (not shown). The bandwidth of the channel filter is preferably set at 60 MHz. The controller 250 arranges the channel filter through an I²C bus for acquiring a certain RF band of signal and lowering it down to a baseband to thereby produce the analog baseband signal.

The ADC 210 is connected to the tuner 205 in order to down-convert the analog signal to a digital baseband signal. The ADC operating frequency is preferably set at 90 MHz.

The tuner auto-gain controller (AGC) 215 is connected to the ADC 210 and the tuner 205 in order to automatically tune a gain of the tuner based on the digital baseband signal to thereby arrange the amplitude of the analog baseband signal generated by the tuner 205 so as to meet with the input range of the ADC.

The digital mixer 220 is connected to the ADC 210 and the controller 250 in order to receive the digital baseband signal generated by the ADC 210. The digital mixer 220 is based on a digital carrier frequency offset D_CFO designated by the controller 250 to perform a frequency shifting on the digital baseband signal to thereby produce an offset baseband signal.

The interpolator 225 is connected to the digital mixer 220 and the controller 250 in order to perform an interpolation operation on the offset baseband signal according to a down-sampling factor (DSF) designated by the controller 250, so as to produce an interpolated offset baseband signal. The interpolator includes a cascaded integrator and comb filter (CIC) to perform an anti-aliasing and reject possible adjacent channel interference. The interpolator 225 completes the down-sampling operation by performing the interpolation operation.

The DAGC 230 is connected to the interpolator 225 in order to perform an auto-gain adjustment on the interpolated offset baseband signal to thereby produce a gained baseband signal.

The digital matched filer (DMF) 235 is connected to the DAGC 230 in order to filter the gained baseband signal to thereby produce a filtered baseband signal. The working bandwidth of the DMF 235 is a half of the operating frequency of the ADC 210. Namely, the working bandwidth of the DMF 235 is preferably to be 45 MHz. The DMF 235 is preferably to be a square root raised cosine filter (SRRC).

The spectrum computation device 240 is connected to the digital matched filter 235 and the controller 250 in order to calculate and produce a spectrum of the filtered baseband signal.

Figure 3:
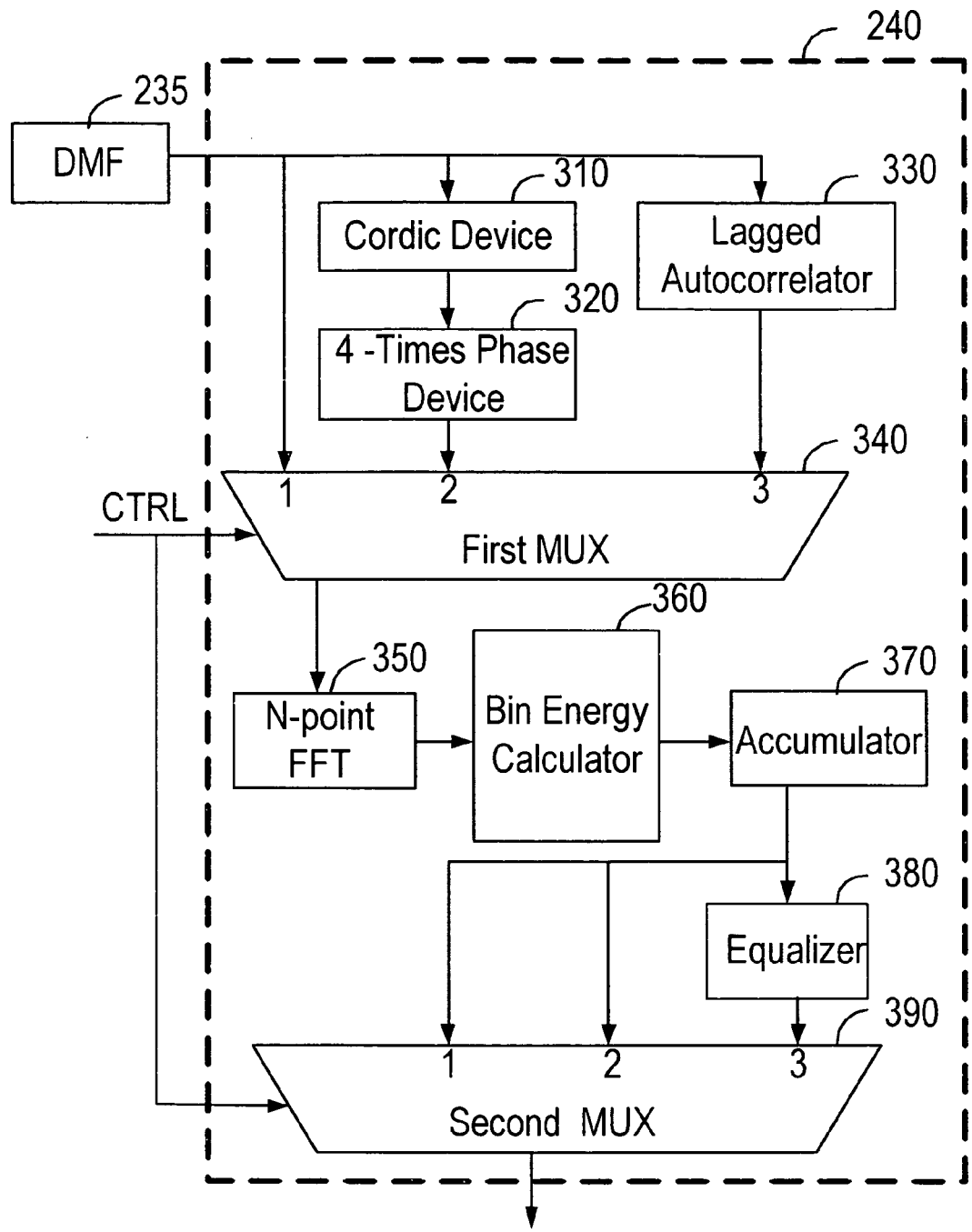
FIG. 3 is a block diagram of a spectrum computation device according to an embodiment of the invention.

FIG. 3 is a block diagram of the spectrum computation device 240 according to an embodiment of the invention. In FIG. 3, the spectrum computation device 240 includes a Cordic device 310, a 4-times phase device 320, a lagged autocorrelator 330, a first multiplexer 340, an N-point fast Fourier transform (FFT) device 350, a bin energy calculator 360, an accumulator 370, an equalizer 380 and a second multiplexer 390.

The Cordic device 310 is connected to the digital matched filter (DMF) 235 in order to receive the filtered baseband signal and perform a operation on the filtered baseband signal to thereby obtain a phase for every sampling point on the filtered baseband signal.

The 4-times phase device 320 is connected to the Cordic device 310 and a second input terminal of the first multiplexer 340 in order to perform a 4-times phase operation on a signal generated by the Cordic device to thereby generate a result to the second input terminal of the first multiplexer 340.

The lagged autocorrelator 330 is connected to the DMF 235 and a third input terminal of the first multiplexer 340 in order to receive the filtered baseband signal to thereby calculate an autocorrelation signal for the filtered baseband signal and generate the autocorrelation signal to the third input terminal of the first multiplexer 340. The lagged autocorrelator 330 receives the filtered baseband signal $r_n$ and generates a signal expressed as $r_n \times (r_{n-1})^*$, where n indicates a sample index.

The first multiplexer 340 has a control terminal connected to the controller 250 for receiving a control signal CTRL, and has a first input terminal connected to the DMF 235 for receiving the filtered baseband signal. The first multiplexer 340 is based on the control signal to select a signal from its first, second, or third input terminal for use as an output signal.

The N-point fast Fourier transform (FFT) device 350 is connected to the first multiplexer 340 in order to perform a Fourier transform on the output signal of the first multiplexer 340.

The bin energy calculator 360 is connected to the N-point FFT device 350 in order to calculate the energy at each sampling point in an output signal of the N-point FFT device 350.

The accumulator 370 is connected to the bin energy calculator 360 in order to accumulate output signals of the calculator 360 to thereby obtain an averaged spectrum.

The equalizer 380 is connected to the accumulator 370 in order to perform an equalization operation on the averaged spectrum to thereby equalize the bases of estimating spectrums for accurately identifying the peak position on the subsequent peak detection.

The second multiplexer 390 has a control terminal connected to the controller 250 for receiving the control signal CTRL, a first input terminal and a second input terminal connected to an output terminal of the accumulator 370, and a third input terminal connected to an output terminal of the equalizer 380 for selecting a signal from its first, second, or third input terminal for use as an output signal according to the control signal CTRL.

When the control signal indicates a value "1", the filtered baseband signal generated by the DMF 235 passes through the N-point FFT device 350, the calculator 360 and the accumulator 370. In this case, the spectrum computation device 240 generates the spectrum of the filtered baseband signal.

When the control signal indicates a value "2", the filtered baseband signal generated by the DMF 235 passes through the Cordic device 310, the 4-times phase device 320, the N-point FFT device 350, the calculator 360 and the accumulator 370. In this case, the phase of each sampling point on the filtered baseband signal is first extracted by the Cordic device 310, then processed by the 4-times phase device 320, and finally computed by the N-point FFT device 350 to thereby produce a peak at location corresponding to four times of carrier frequency offset, 4 fΔ. Accordingly, the spectrum parameter extractor 245 can use a peak location detection technique to find an offset, which is referred to as a fine carrier frequency offset F_CFO.

When the control signal indicates a value "3", the filtered baseband signal generated by the DMF 235 passes through the lagged autocorrelator 330, the N-point FFT device 350, the calculator 360, the accumulator 370 and the equalizer 380 to thereby obtain a signal with a peak at a symbol rate. Accordingly, the spectrum parameter extractor 245 can use a peak location detection technique to find a symbol rate, which is referred to as a fine symbol rate F_SR. The accuracy of the fine carrier frequency offset F_CFO and fine symbol rate F_SR is determined by the number of points used by the N-point FFT device 350.

The spectrum parameter extractor 245 is connected to the spectrum computation device 240 and the controller 250 in order to calculate the carrier frequency offsets F_CFO, C_CFO of the spectrum, the symbol rates F_SR, C_SR of the digital baseband signal, and the cross points CP1, CP2 of the spectrum crossed with a fourth threshold.

Figure 4:
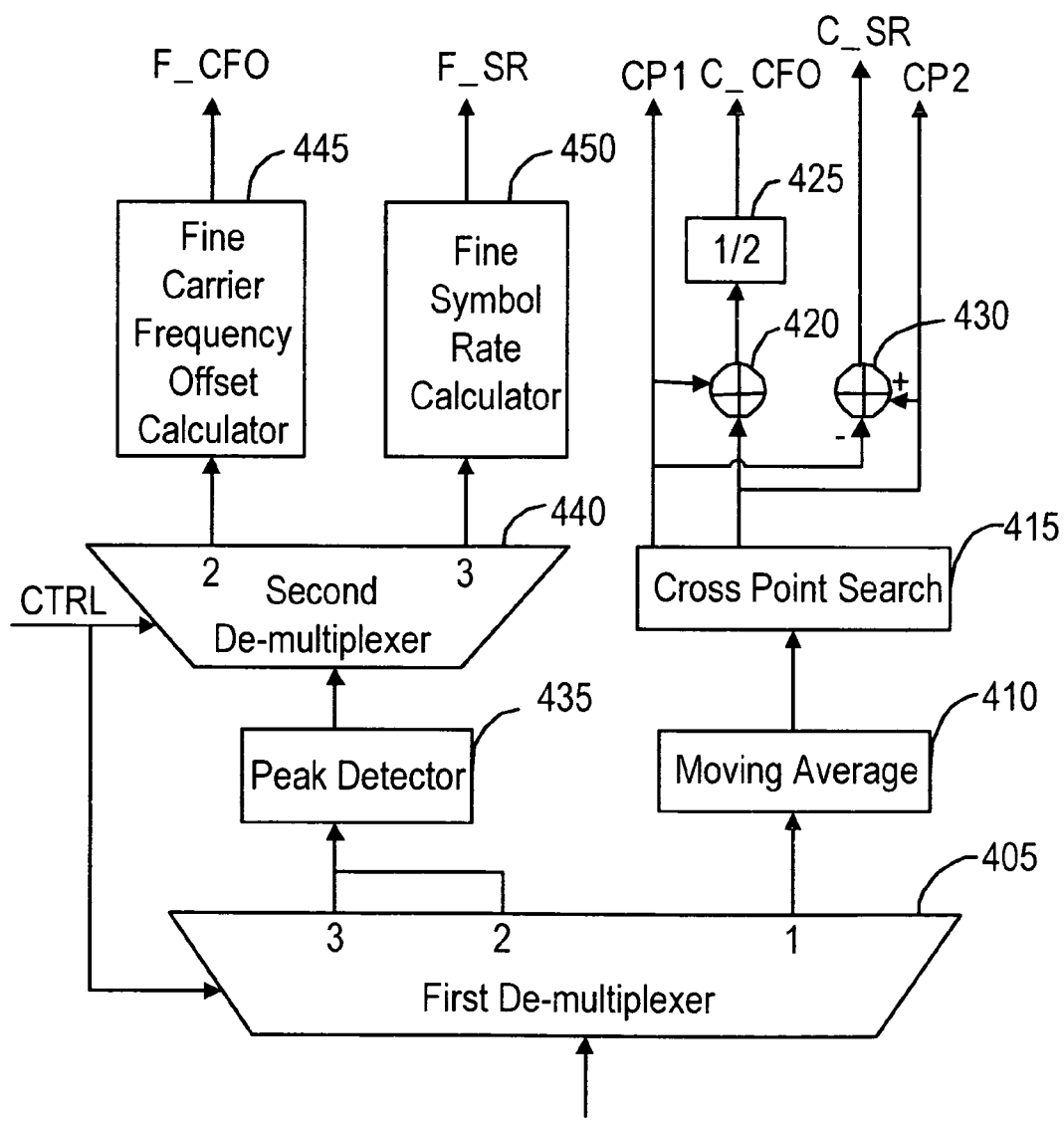
FIG. 4 is a block diagram of a spectrum parameter extractor according to an embodiment of the invention.

FIG. 4 is a block diagram of the spectrum parameter extractor 245 according to an embodiment of the invention. In FIG. 4, the spectrum parameter extractor 245 includes a first de-multiplexer 405, a moving average device 410, a cross point search device 415, an adder 420, a divider 425, a subtractor 430, a peak detector 435, a second de-multiplexer 440, a fine carrier frequency offset calculator 445 and a fine symbol rate calculator 450.

The first de-multiplexer 405 is connected to the spectrum computation device 240 and the controller 250 in order to generate an output signal of the spectrum computation device 240 through its first, second or third output terminal according to the control signal CTRL generated by the controller 250.

The moving average device 410 is connected to the first output terminal of the first de-multiplexer 405 in order to perform a moving average operation on a spectrum of the output signal of the spectrum computation device 240 to thereby produce a smooth spectrum.

The cross point search device 415 is connected to the moving average device 410 in order to find a first cross point CP1 and a second cross point CP2 by crossing the smooth spectrum with a fourth threshold TH4 for output. The first cross point CP1 indicates a position where the frequency of the smooth spectrum is over the fourth threshold at first time, and the second cross point CP2 indicates a position behind CP1 where the frequency of the smooth spectrum is below the fourth threshold at first time. The fourth threshold TH4 can be expressed as follows:

$$TH4=(Max-Min)\times \eta+Min,$$

where TH4 indicates the fourth threshold, Max indicates the amplitude maximum of the smooth spectrum, Min indicates the amplitude minimum of the smooth spectrum, and $\eta$ indicates a second tuning factor, for $0 \leq \eta \leq 1$ and $\eta$ is preferably to be 0.3.

The adder 420 is connected to the cross point search device 415 in order to add the first and the second cross points CP1 and CP2. The divider 425 is connected to the adder 420 in order to divide an output signal of the adder 420 by two to thereby produce the coarse carrier frequency offset C_CFO.

The subtractor 430 is connected to the cross point search device 415 in order to subtract the second cross point CP2 from the first cross point CP1 to thereby produce the coarse symbol rate C_SR of the digital baseband signal.

The peak detector 435 is connected to the second and third output terminals of the first de-multiplexer 405 in order to perform a peak detection on an output spectrum of the spectrum computation device 240 to thereby produce a peak location index corresponding to the output spectrum.

The second de-multiplexer 440 is connected to the peak detector 435 in order to select its second or third output terminal to generate the output signal of the peak detector according to the control signal CTRL.

The fine carrier frequency offset calculator 445 is connected to a second output terminal of the second de-multiplexer 440 in order to calculate the fine carrier frequency offset F_CFO according to a peak corresponding to the peak location index.

The fine symbol rate calculator 450 is connected to the second de-multiplexer 440 in order to calculate the fine symbol rate F_SR according to the peak.

The controller 250 is connected to the tuner 205, the digital mixer 220, and the interpolator 225. The controller 250 is based on the carrier frequency of the target channel to calculate the analog carrier frequency offset A_CFO to thereby tune the tuner 205.

The controller 250 is based on the symbol rate SR of the target channel to calculate a down-sampling factor (DSF), and the interpolator 225 can perform a down-sampling operation on the digital baseband signal according to the down-sampling factor.

The controller 250 determines whether the coarse carrier frequency offset C_CFO generated by the spectrum parameter extractor 245 is greater than a first threshold. When the coarse carrier frequency offset C_CFO is greater than the first threshold, the controller 250 is based on the coarse carrier frequency offset C_CFO to calculate the analog carrier frequency offset A_CFO to accordingly tune the tuner 205. When the coarse carrier frequency offset C_CFO is not greater than the first threshold, the controller 250 stops tuning the tuner 205. The first threshold can be obtained, depending on the desired system accuracy, by those skilled in the art.

In addition, the controller 250 can use the coarse symbol rate C_SR generated by the spectrum parameter extractor 245 to produce the down-sampling factor (DSF). The interpolator 225 is based on the DSF to perform the down-sampling operation to thereby allow the spectrum of the digital baseband signal to fill up the working bandwidth of the digital matched filter 235 for increasing the signal to noise ratio (SNR) and improving the spectrum resolution.

The controller 250 is based on the fine carrier frequency offset F_CFO generated by the spectrum parameter extractor 245 to arrange the digital mixer 220 to thereby determine whether a signal at the fine carrier frequency offset is a channel to be acquired. When the signal at the fine carrier frequency offset presents, the controller is based on the fine carrier frequency offset to arrange the digital mixer 220 to thereby locate a spectrum of the target channel in the working bandwidth of the digital mixer for acquiring data.

Since the down-sampling technique is not applied in the prior art, the working bandwidth of the digital matched filter 235 possibly contains noises and adjacent channel interferences in addition to the spectrum of the target channel. Accordingly, it is likely to have an error in an estimation process. To overcome this drawback, this invention applies the down-sampling technique to the digital baseband signal based on the symbol rates of the target channel, and in this case the digital baseband signal becomes the main component at the output of the digital matched filter 235. Further, the inband SNR and spectrum resolution of the digital matched filter is raised to sharpen the accuracy of the fine carrier frequency offset F_CFO and fine symbol rate F_SR in estimation.

Due to the spectrum symmetry, the spectrum of a signal is typically shifted to 0 MHz in the working bandwidth of the digital matched filter 235. Namely, when the spectrum of the signal locates in a range of the working bandwidth of the digital matched filter 235, the prior art has to tune the tuner 205 to shift the spectrum of the signal to 0 MHz in the working bandwidth of the digital matched filter 235. However, such a shifting is not required in the invention when the estimated CFO is small. In stead, we employ digital mixer 220 for spectrum shifting. Namely, the invention uses a digital signal processing technique when the estimated CFO is small to obtain the function of the analog mixer, and the operating speed is much faster than an analog tuner. Therefore, the time required for channel parameter estimation is effectively reduced.

Figure 5:
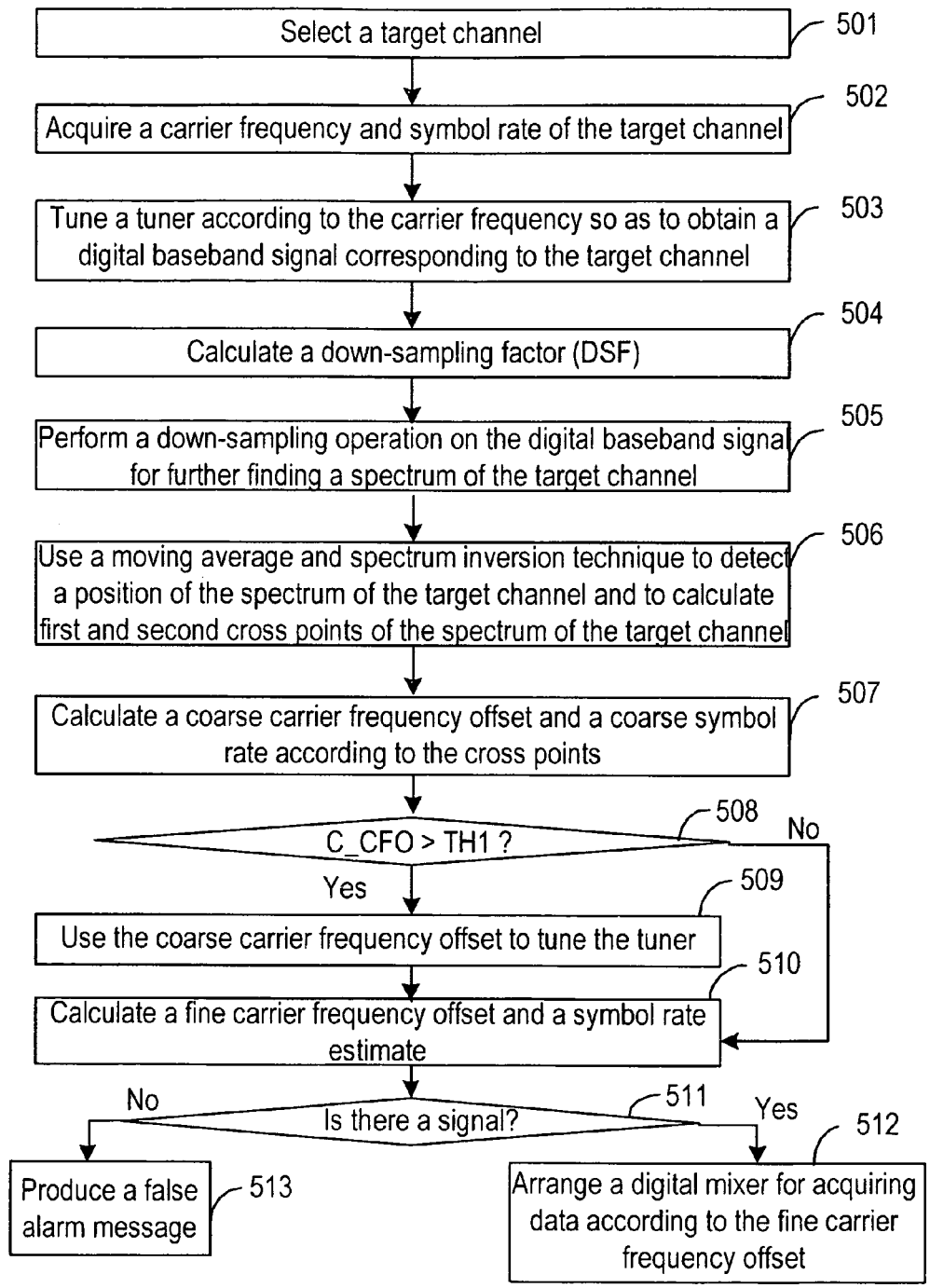
FIG. 5 is a flowchart of a method for acquiring a channel with a frequency offset less than half symbol rate according to an embodiment of the invention.

FIG. 5 is a flowchart of a method for acquiring a channel with a frequency offset less than half symbol rate according to an embodiment of the invention.

As shown in FIG. 5, step 501 selects a target channel.

Step 502 acquires a carrier frequency and symbol rate of the target channel. The carrier frequency and symbol rate can be obtained from a pre-stored table or by performing a blind scan method.

Step 503 is based on the carrier frequency to tune the tuner 205 to thereby obtain a digital baseband signal corresponding to the target channel.

In step 504, the controller 250 calculates a down-sampling factor (DSF). The DSF is obtained based on the symbol rate (SR) of the target channel in step 502 and the bandwidth of the DMF 235. The DSF is expressed as:

$$DSF = \frac{BW_{DMF}}{SR \times \varsigma},$$

where DSF indicates the down-sampling factor, $BW_{DMF}$ indicates the bandwidth of the digital matched filter 235, SR indicates the symbol rate of the target channel in step 502, and $\varsigma$ indicates a first tuning factor, for $1 \leq \varsigma$.

In step 505, the controller 250 is based on the down-sampling factor to arrange the interpolator 225 to perform a down-sampling operation on the digital baseband signal to thereby produce an interpolated offset baseband signal. Next, an auto-gain adjustment and a filtering process are performed on the interpolated offset baseband signal, and the spectrum computation device 240 can calculate the spectrum of the interpolated offset baseband signal after the auto-gain adjustment and the filtering process.

In step 506, the spectrum parameter extractor 245 uses a moving average and spectrum inversion technique to detect a position of the spectrum of the target channel and to calculate a first cross point CP1 and a second cross point CP2 of the spectrum crossed over the fourth threshold.

In step 507, the spectrum parameter extractor 245 is based on the cross points GP1, GP2 to calculate a coarse carrier frequency offset C_CFO and a coarse symbol rate C_SR. The controller 250 uses the coarse symbol rate C_SR to calculate the DSF. Namely, the DSF is obtained based on the coarse symbol rate C_SR and the bandwidth of the DMF 235. In this case, the DSF is expressed as:

$$DSF = \frac{BW_{DMF}}{C\_SR \times \varsigma},$$

where DSF indicates the down-sampling factor, $BW_{DMF}$ indicates the bandwidth of the DMF 235, C_SR indicates the coarse symbol rate, and $\varsigma$ indicates a first tuning factor, for $1 \leq \varsigma$.

Step 508 determines whether the coarse carrier frequency offset C_CFO is greater than a first threshold TH1. If yes, it indicates that the frequency offset is large so that partial spectrum of target signal falls outside channel filter, and in this case tuning the tuner 205 is required, so step 509 is executed. When step 508 decides that the coarse carrier frequency offset C_CFO is not greater than the first threshold TH1, step 510 is executed. The first threshold can be obtained, depending on the desired system accuracy, by those skilled in the art.

In step 509, the controller 250 uses the coarse carrier frequency offset to produce an analog carrier frequency offset A_CFO to accordingly tune the tuner 205 for locating the spectrum of the target channel at the middle of the working bandwidth of the tuner 205 and obtaining a tuned digital baseband signal corresponding to the target channel.

Step 510 calculates a fine carrier frequency offset F_CFO and a symbol rate estimate SRest for the target channel based on the digital baseband signal in step 508 when the coarse carrier frequency offset C_CFO is not greater than the first threshold TH1, or on the tuned digital baseband signal in step 509. Since the coarse carrier frequency offset C_CFO is not greater than the first threshold TH1, or the tuner 205 is tuned based on the coarse carrier frequency offset C_CFO in step 509, the fine offset F_CFO and symbol rate estimate SRest is calculated more accurate.

In step 511, the controller 250 determines whether a signal at the fine offset F_CFO is a channel to be acquired. In this case, since the spectrum of the digital baseband signal locates entirely in the working bandwidth of the digital matched filter 235, tuning the tuner 205 is not required; i.e. frequency shifting in an analog scheme is not required.

Step 511 uses two conditions to determine whether the channel to be acquired at the fine offset F_CFO is the target channel and to indicate that a signal really presents at the fine offset F_CFO. The two conditions are: a difference between two successive fine carrier frequency offsets F_CFO being smaller than a second threshold TH2, and a difference between the symbol rate estimate and the symbol rate designated by the target channel being smaller than a third threshold TH3. The second threshold TH2 and the third threshold TH3 are obtained based on the desired system accuracy.

In step 512, when there is a signal at the fine offset F_CFO, the controller 250 is based on the fine offset F_CFO to produce a digital carrier frequency offset D_CFO to accordingly arrange the digital mixer 220 for performing a final frequency offset compensation on the spectrum of the target channel. Finally, the data is extracted, and the process ends.

When step 511 decides that the channel acquired is not the target channel, step 513 is executed to produce a false alarm message to thereby indicate that there is no signal at the fine offset F_CFO, and the process ends.

Figure 6:
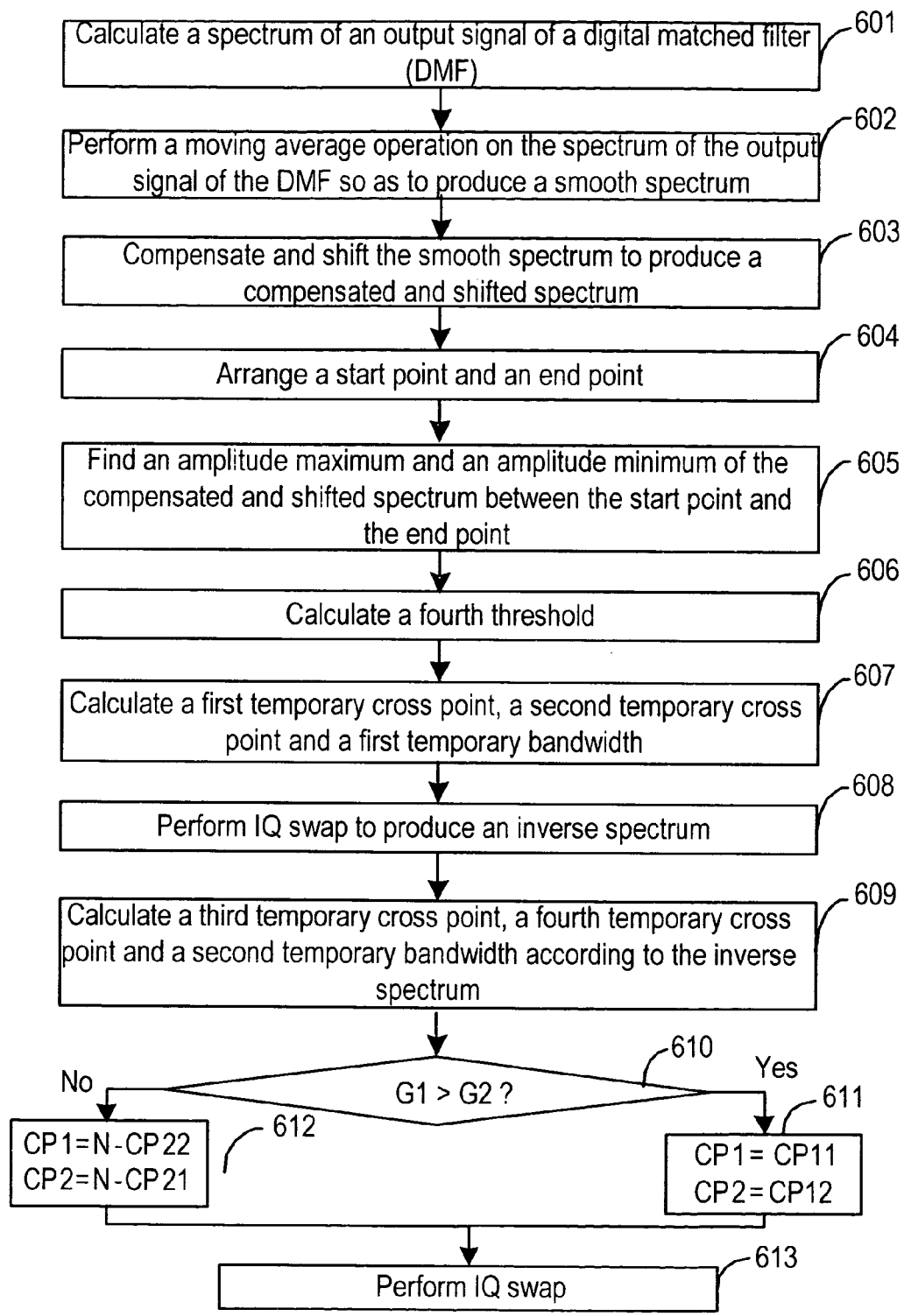
FIG. 6 is a flowchart of calculating cross points of a spectrum according to an embodiment of the invention.

FIG. 6 is a flowchart of calculating the cross points CP1, CP2 of the spectrum in step 506 according to an embodiment of the invention. As shown in FIG. 6, the cross points CP1, CP2 are calculated in detail as follows.

Step 601 uses an N-point fast Fourier transform (FFT) device to calculate the spectrum of an output signal of the DMF 235.

Step 602 performs a moving average operation on the spectrum produced in step 601 to thereby produce a smooth spectrum. The moving average operation is performed with window size $W_{MA}$.

Since the total number of bins expressing the smooth spectrum is reduced, and the offset in spectrum position after the moving average operation occurs, step 603 compensates and shifts the smooth spectrum to thereby produce a compensated and shifted spectrum.

Step 604 arranges start and end points SP, EP in the compensated and shifted spectrum, for SP=1, EP=N/2, where N indicates the number of points of the FFT device.

Step 605 finds an amplitude maximum and minimum Max, Min of the compensated and shifted spectrum between the start and end points SP, EP. The range within start point SP and end point EP is employed essentially to identify the amplitude maximum Max and the amplitude minimum Min.

Step 606 is based on the amplitude maximum and minimum Max, Min to calculate a fourth threshold TH4 expressed as follows:

$$TH4=(Max-Min)\times\eta+Min,$$

where TH4 indicates the fourth threshold, Max indicates the amplitude maximum of the compensated and shifted spectrum, Min indicates the amplitude minimum of the compensated shifted spectrum, and $\eta$ indicates a second tuning factor, for $0\leq\eta\leq1$ and $\eta$ is preferably to be 0.3.

Step 607 calculates a first temporary cross point CP11, a second temporary cross point CP12, and a first temporary bandwidth G1.

Figure 7:
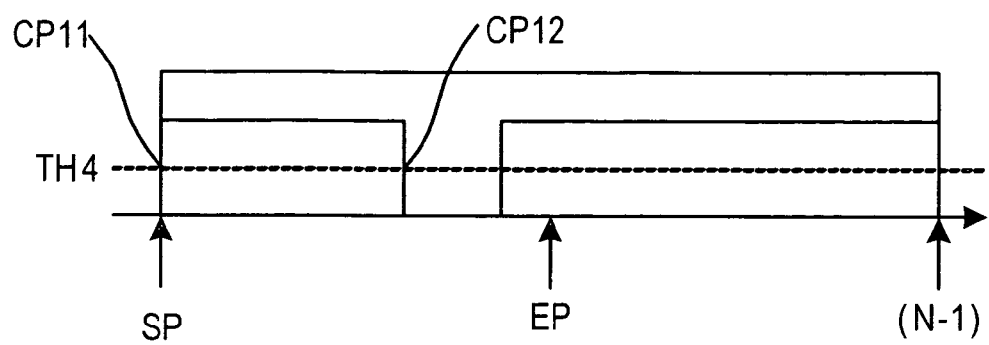
FIG. 7 is a schematic diagram of cross points of a spectrum according to an embodiment of the invention.

FIG. 7 is a schematic diagram of the cross points according to an embodiment of the invention. As shown in FIG. 7, the first temporary cross point CP11 indicates a frequency (or referred to as an index) where the amplitude of the compensated and shifted spectrum is over the fourth threshold TH4 at first time, and the second temporary cross point CP12 indicates a frequency or index greater than CP11 where the amplitude of the compensated and shifted spectrum is below the fourth threshold TH4 at first time. The first temporary bandwidth G1 equals to a bandwidth obtained by subtracting the first temporary cross point CP11 from the second temporary cross point CP12.

Step 608 performs an inband and quadrature (IQ) swap to thereby invert the spectrum and produce an inverse spectrum.

After the real and imaginary parts of a signal are swapped by a digital signal processing technique, the spectrum of the new signal is obtained by inverting and complex-conjugating the spectrum of the original signal. Namely, if the digital baseband signal is expressed as $r_n=I_n+jQ_n$, a new signal can be obtained by swapping the real part and the imaginary part into $r_n'=Q_n+jI_n$, and its spectrum is obtained by inverting and complex-conjugating the spectrum of the signal $r_n$, as shown in FIG. 8 that is an absolute spectrum of the signal $r_n'=Q_n+jI_n$ with respect to the signal $r_n$ of FIG. 7.

Step 609 is based on the inverse spectrum to calculate a third temporary cross point CP21, a fourth temporary cross point CP22, and a second temporary bandwidth G2.

Figure 8:
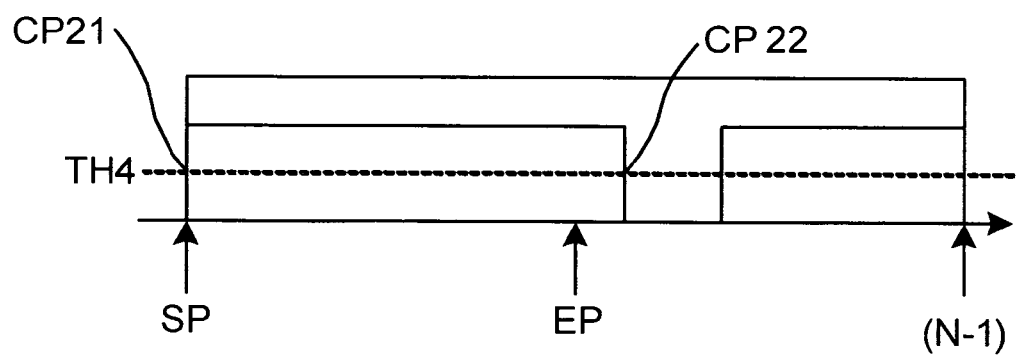
FIG. 8 is a schematic diagram of cross points of an inverse spectrum according to an embodiment of the invention.

FIG. 8 is a schematic diagram of the cross points of the inverse spectrum according to an embodiment of the invention. As shown in FIG. 8, the third temporary cross point CP21 indicates a frequency (or referred to as an index) where the amplitude of the compensated and shifted spectrum over the fourth threshold TH4 at first time, and the fourth temporary cross point CP22 indicates a frequency or index greater than CP21 where the amplitude of the compensated and shifted spectrum below the fourth threshold TH4 at first time. The second temporary bandwidth G2 equals to a bandwidth obtained by subtracting the third temporary cross point CP21 from the fourth temporary cross point CP22.

Figure 9A:
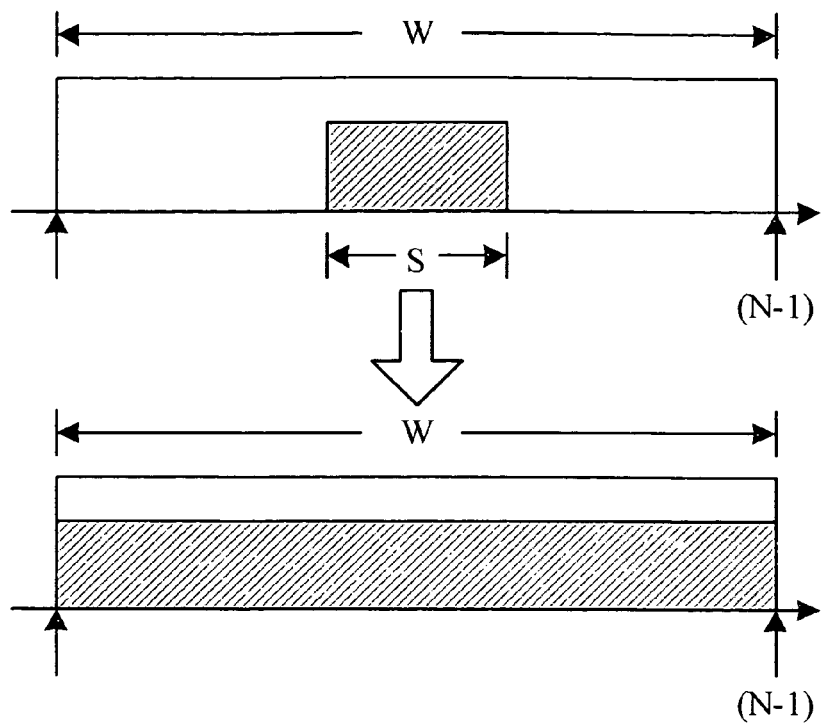
FIGS. 9(A) and 9(B) are schematic diagrams of using a down-sampling factor to perform a down-sampling operation on a spectrum according to an embodiment of the invention.
Figure 9B:
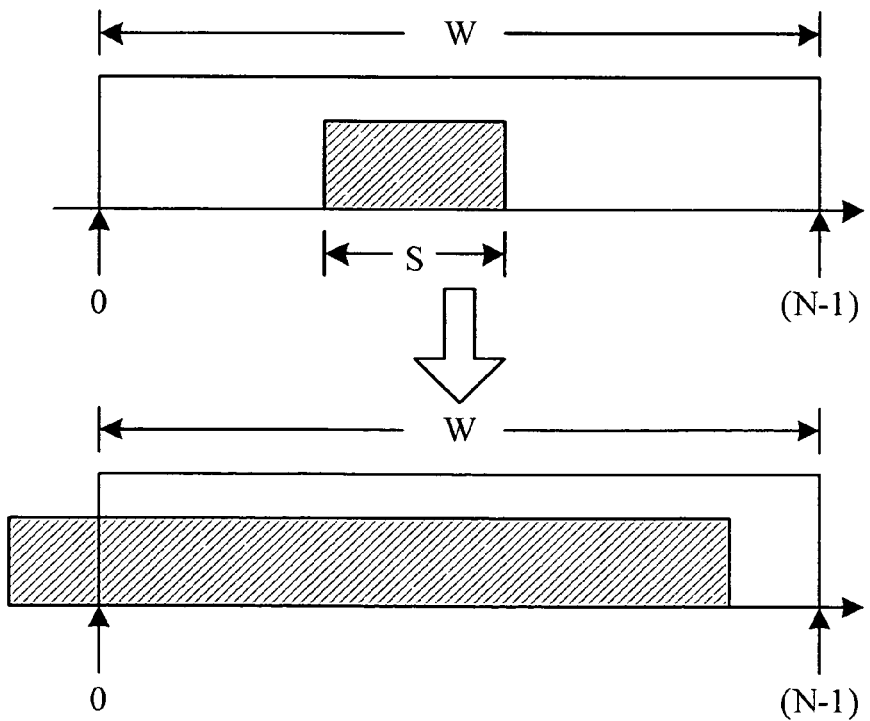

FIGS. 9(A) and 9(B) are schematic diagrams of using a down-sampling factor to perform a down-sampling operation on a spectrum according to an embodiment of the invention. As shown in FIG. 9(A), when the baseband signal has no frequency offset, the interpolator 225 is based on the down-sampling factor (DSF) to perform a down-sampling operation on the baseband signal to thereby fill up the bandwidth of the DMF 235.

As shown in FIG. 9(B), when the baseband signal has a frequency offset, the bandwidth of the DMF 235 cannot be filled up after the interpolator 225 performs a down-sampling operation on the baseband signal according to the down-sampling factor (DSF). Since the frequency offset is smaller than half the symbol rate, the inband bandwidth of the digital baseband signal after the down-sampling operation is greater than half the bandwidth of the DMF 235.

Namely, the inband bandwidth of the digital baseband signal after the down-sampling operation is greater than half the bandwidth of the DMF 235, in spite of whether there is frequency offset or not. This is the key fact used to distinguish and identify the spectrum of the target channel in this disclosure.

Step 610 determines whether the first temporary bandwidth G1 is greater than the second temporary bandwidth G2. If yes, step 611 is executed; otherwise step 612 is executed.

In step 611, when the first temporary bandwidth G1 is greater than the second temporary bandwidth G2, it indicates that the bandwidth of the digital baseband signal after the down-sampling operation starts with the start point SP and extends along to exceed the end point EP. In this case, the first cross point CP1 is located on the first temporary cross point CP11, the second cross point CP2 is located on the second temporary cross point CP12, and accordingly the IQ swap is performed in step 613.

In step 612, when the first temporary bandwidth G1 is not greater than the second temporary bandwidth G2, it indicates that the bandwidth of the digital baseband signal after the down-sampling operation starts with the (N−1)-th point and extends along to exceed the end point EP. In this case, the first cross point CP1 is located on a point of N minus the fourth temporary cross point CP22, the second cross point CP2 is located on a point of N minus the third temporary cross point CP21, and accordingly the IQ swap is performed in step 613.

Step 613 performs the IQ swap.

For a digital signal processing, the IQ swap is performed by swapping the real and imaginary parts of a signal.

Figure 10:
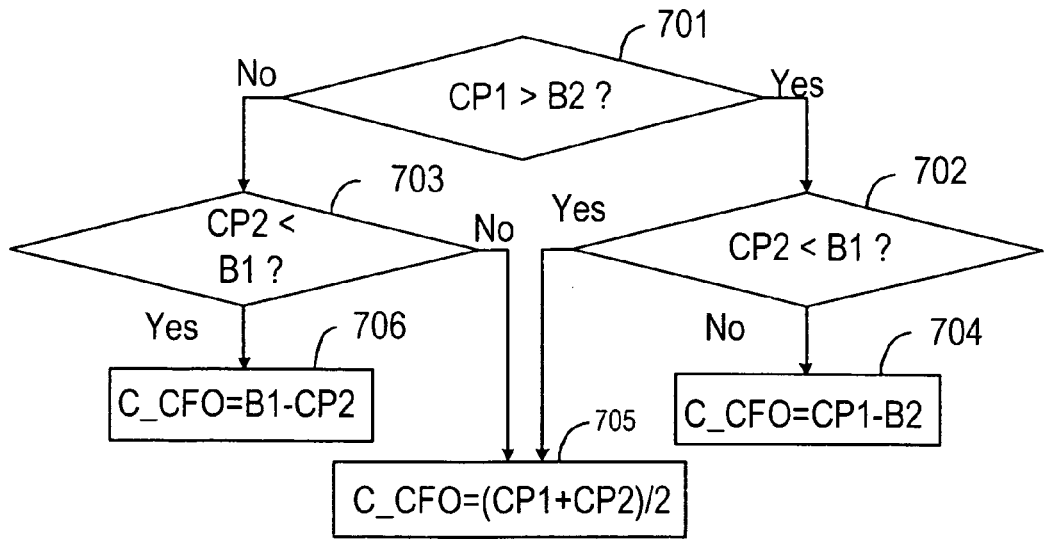
FIG. 10 is a flowchart of calculating a coarse carrier frequency offset according to an embodiment of the invention.

FIG. 10 is a flowchart of calculating a coarse carrier frequency offset in step 507 according to an embodiment of the invention. Since the transition band of the digital matched filter 235 does not have a 90-degree gradient, two boundaries B1, B2 are designated by the filter 235 at the neighborhood where the pass band connects to the transition band for the purpose of convenient description. The boundary B1 indicates a positive frequency, and the boundary B2 indicates a negative frequency. The value of the coarse carrier frequency offset C_CFO is calculated based on the size relationship between two cross points CP1, CP2 and two boundaries B1, B2. The detail is described as follows.

Figure 11A:
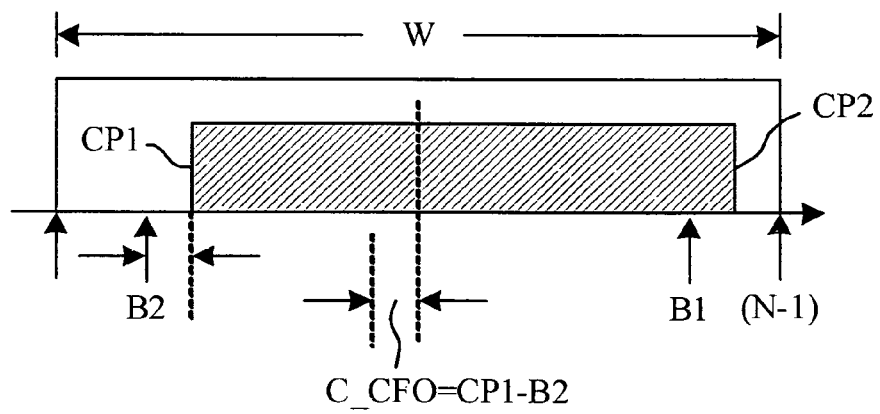
FIGS. 11(A) to 11(D) are schematic diagrams of coarse carrier frequency offsets according to an embodiment of the invention.

Step 701 determines whether the first cross point CP1 is greater than a second boundary B2. If yes, step 702 further determines whether the second cross point CP2 is smaller than a first boundary B1. When the second cross point CP2 is smaller than the first boundary B1, the coarse carrier frequency offset C_CFO in step 704 equals to the first cross point CP1 minus the second boundary B2. FIG. 11(A) is a schematic diagram of a coarse carrier frequency offset C_CFO. As shown in FIG. 11(A), signals between the first boundary B1 and the second cross point CP2 are possibly located on the transition band. Accordingly, the signals are not reliable, so the coarse carrier frequency offset C_CFO equals to (CP1-B2).

Figure 11B:
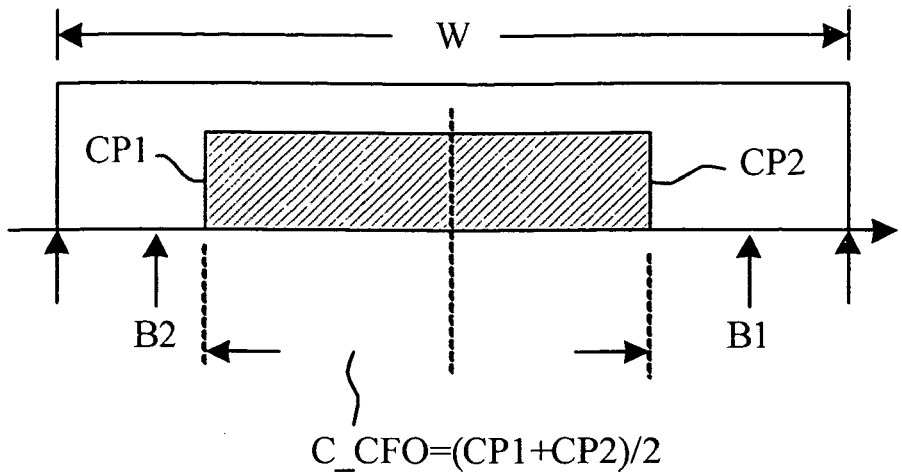

When step 701 decides that the first cross point CP1 is greater than the second boundary B2, and step 702 decides that the second cross point CP2 is not smaller than the first boundary B1, the coarse carrier frequency offset C_CFO in step 705 equals to an average of the first cross point CP1 and the second cross point CP2. FIG. 11(B) is a schematic diagram of another coarse carrier frequency offset C_CFO. As shown in FIG. 11(B), all signals between the first boundary B1 and the second cross point CP2 are located in the pass band of the filter 235. Thus, the coarse carrier frequency offset C_CFO equals to (CP1+CP2)/2.

Figure 11C:
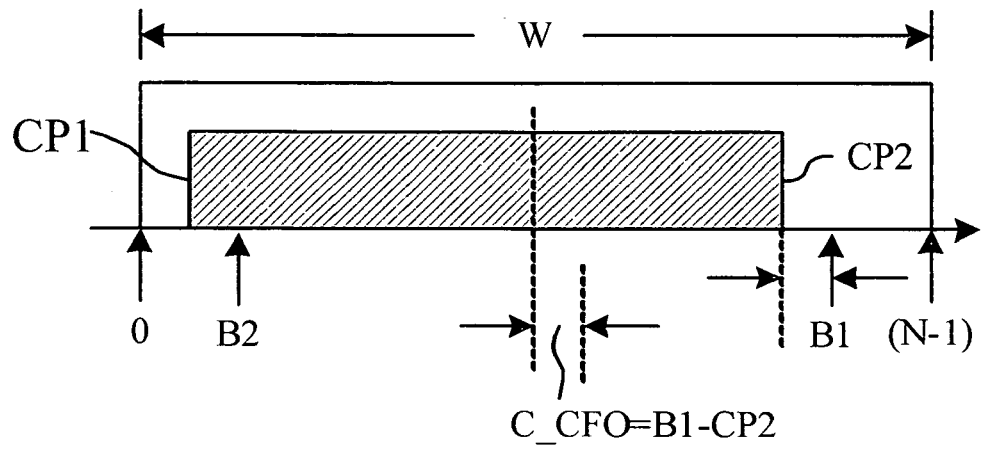

When step 701 decides that the first cross point CP1 is not greater than the second boundary B2, step 703 further determines whether the second cross point CP2 is smaller than the first boundary B1. If yes, the coarse carrier frequency offset C_CFO in step 706 equals to the first boundary B1 minus the second cross point CP2. FIG. 11(C) is a schematic diagram of another coarse carrier frequency offset C_CFO. As shown in FIG. 11(C), signals between the first boundary B1 and the second cross point CP2 are possibly located on the transition band of the filter 235, so the signals are not reliable. Thus, the coarse carrier frequency offset C_CFO equals to (B1−CP2).

Figure 11D:
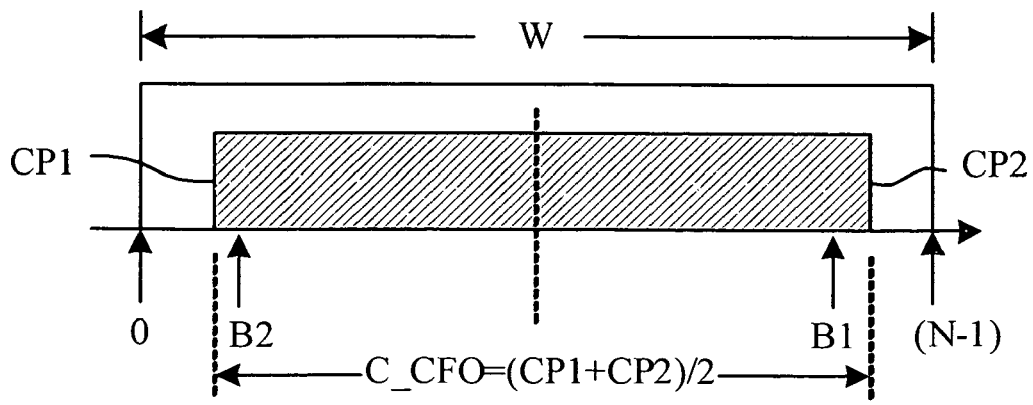

When step 701 decides that the first cross point CP1 is not greater than the second boundary B2, and step 703 decides that the second cross point CP2 is not smaller than the first boundary B1, the coarse carrier frequency offset C_CFO in step 705 equals to an average of the first cross point CP1 and the second cross point CP2. FIG. 11(D) is a schematic diagram of another coarse carrier frequency offset C_CFO. As shown in FIG. 11(D), the coarse carrier frequency offset C_CFO equals to (CP1+CP2)/2 because the transition band of the filter 235 on both sides has signals.

The coarse symbol rate C_SR equals to the second cross point CP2 minus the first cross point CP1.

As cited, for acquiring a channel and associated data, the invention can provide simpler and more accurate method than the prior art and also overcome the prior problems that the accuracy and reliability of the pre-stored content change with time, and that the carrier frequency and the symbol rate obtained by the blind scan method are uncertain. In addition, the invention can correct a frequency offset at most to half the symbol rate. Further, programming or tuning the tuner 205 is performed only at steps (C) and (H1), so the performance is generally quite high. The inventive hardware is commonly used with the blind scan method, which can further reduce the hardware cost.

Although the present invention has been explained in relation to its preferred embodiment, it is to be understood that many other possible modifications and variations can be made without departing from the spirit and scope of the invention as hereinafter claimed.

What is claimed is:

1. A method for acquiring a channel with a frequency offset less than half symbol rate in a receiver of a Digital Video Broadcasting-Satellite (DVB-S) system, the method comprising the steps of:
    (A) selecting a target channel;
    (B) acquiring a carrier frequency and symbol rate of the target channel;
    (C) tuning a tuner according to the carrier frequency so as to obtain a digital baseband signal corresponding to the target channel;
    (D) calculating a down-sampling factor (DSF) according to the symbol rate in step (B);
    (E) performing a down-sampling operation on the digital baseband signal according to the down-sampling factor for further finding a spectrum of the target channel;
    (F) using a moving average and spectrum inversion technique to detect a position of the spectrum of the target channel and to calculate a first cross point and a second cross point of the spectrum of the target channel, in which step (F) comprises:
        using an N-point fast Fourier transform (FFT) device to calculate a spectrum of an output signal of a digital matched filter (DMF);
        performing a moving average operation on the spectrum of the output signal of the DMF to thereby produce a smooth spectrum;
        compensating and shifting the smooth spectrum to thereby produce a compensated and shifted spectrum;
        arranging a start point and an end point in the compensated and shifted spectrum, in which the start point equals to one and the end point equals to N/2, where N indicates a number of points of the FFT device;
        finding an amplitude maximum and an amplitude minimum of the compensated and shifted spectrum between the start point and the end point;
        calculating a fourth threshold according to the amplitude maximum and the amplitude minimum;
        calculating a first temporary cross point, a second temporary cross point and a first temporary bandwidth;
        performing an inband and quadrature (IQ) swap to thereby invert the compensated and shifted spectrum and produce an inverse spectrum;
        calculating a third temporary cross point, a fourth temporary cross point, and a second temporary bandwidth according to the inverse spectrum;
        when the first temporary bandwidth is greater than the second temporary bandwidth, setting the first temporary cross point to become the first cross point and setting the second temporary cross point to become the second cross point, and performing the IQ swap; and
        when the first temporary bandwidth is not greater than the second temporary bandwidth, setting the first cross point to become N minus the fourth temporary cross point and setting the second cross point to become N minus the third temporary cross point;
    (G) calculating a coarse carrier frequency offset and a coarse symbol rate according to the cross points;
    (H) determining whether the coarse carrier frequency offset is greater than a first threshold, and tuning the tuner based on the coarse carrier frequency offset when the coarse carrier frequency offset is greater than the first threshold, so that the spectrum of the target channel is located at a middle of a working bandwidth of the tuner to obtain a tuned digital baseband signal corresponding to the target channel;
    (I) calculating a fine carrier frequency offset and a symbol rate estimate for the target channel according to the tuned digital baseband signal; and
    (J) arranging a digital mixer based on the fine carrier frequency offset for determining whether a signal at the fine carrier frequency offset is a channel to be acquired, and arranging the digital mixer based on the fine carrier frequency offset when a signal at the fine carrier frequency offset presents, so as to locate the spectrum of the target channel in a working bandwidth of the digital mixer for acquiring data.

2. The method as claimed in claim 1, wherein step (G) further calculates a down-sampling factor according to the coarse symbol rate obtained, and performs a down-sampling operation on the digital baseband signal according to the down-sampling factor so as to find a spectrum of the target channel.

3. The method as claimed in claim 2, wherein step (H) directly generates the digital baseband signal, without tuning the tuner, when the coarse carrier frequency offset is not greater than the first threshold, and then step (I) is executed.

4. The method as claimed in claim 3, wherein step (J) further produces a false alarm message when there is no signal at the fine carrier frequency offset, and then the method ends.

5. The method as claimed in claim 4, wherein the first temporary bandwidth equals to the second temporary cross point minus the first temporary cross point, and the second temporary bandwidth equals to the fourth temporary cross point minus the third temporary cross point.

6. The method as claimed in claim 5, wherein step (G) comprises:
determining whether the first cross point is greater than a second boundary;
determining whether the second cross point is smaller than a first boundary when the first cross point is greater than the second boundary, and setting the coarse carrier frequency offset to become the first cross point minus the second boundary when the second cross point is smaller than a first boundary, and otherwise setting the coarse carrier frequency offset to become an average of the first and the second cross points; and
determining whether the second cross point is smaller than the first boundary when the first cross point is not greater than the second boundary, and setting the coarse carrier frequency offset to become the first boundary minus the second cross point, and otherwise setting the coarse carrier frequency offset to become an average of the first and the second cross points.

7. The method as claimed in claim 1, wherein, in step (J), the signal at the fine carrier frequency offset is decided to be the channel to be acquired when a difference between two successive fine carrier frequency offsets is smaller than a second threshold, or a difference between the symbol rate estimate and the symbol rate of the target channel is smaller than a third threshold.

8. The method as claimed in claim 1, wherein step (G) calculates the coarse symbol rate by subtracting the first cross point from the second cross point.

9. A device for acquiring a channel with a frequency offset less than half symbol rate in a receiver of a Digital Video Broadcasting-Satellite (DVB-S) system, comprising:
a tuner for receiving a radio frequency (RF) signal of a target channel generated by an antenna and tuning the RF signal down to a baseband based on an analog carrier frequency offset so as to produce an analog baseband signal;
an analog to digital converter (ADC) connected to the tuner for converting the analog baseband signal into a digital baseband signal;
a tuner auto-gain controller (AGC) connected to the ADC and the tuner for tuning a gain of the tuner based on the digital baseband signal;
a digital mixer connected to the ADC for receiving the digital baseband signal and using a digital carrier frequency offset to perform a frequency shifting on the digital baseband signal so as to produce an offset baseband signal;
an interpolator connected to the digital mixer for using a down-sampling factor to perform an interpolation operation on the offset baseband signal so as to produce an interpolated offset baseband signal;
a digital AGC connected to the interpolator for performing an auto-gain adjustment on the interpolated offset baseband signal so as to produce a gained baseband signal;
a digital matched filer (DMF) connected to the digital AGC for filtering the gained baseband signal so as to produce a filtered baseband signal;
a spectrum computation device connected to the digital matched filter for producing a spectrum of the filtered baseband signal;
a spectrum parameter extractor connected to the spectrum computation device for calculating a coarse carrier frequency offset and a fine carrier frequency offset of the spectrum, a coarse symbol rate and a fine symbol rate of the digital baseband signal, and cross points of the spectrum; and
a controller connected to the tuner, the digital mixer, the interpolator, the spectrum computation device, and the spectrum parameter extractor for using a carrier frequency of the target channel to calculate the analog carrier frequency offset and generating the analog carrier frequency offset to the tuner, using the symbol rate of the target channel to calculate the down-sampling factor and generating the down-sampling factor to the interpolator, using the coarse carrier frequency offset of the spectrum to re-calculate the analog carrier frequency offset when the coarse carrier frequency offset of the spectrum generated by the spectrum parameter extractor is greater than a first threshold and using the analog carrier frequency offset re-calculated to tune the tuner, using the coarse symbol rate of the digital baseband signal generated by the spectrum parameter extractor and the cross points of the spectrum to calculate the down-sampling factor and generating the down-sampling factor to the interpolator, using the fine carrier frequency offset generated by the spectrum parameter extractor to arrange the digital mixer, and determining whether a signal at the fine carrier frequency offset is a channel to be acquired, wherein, when the signal at the fine carrier frequency offset presents, the controller arranges the digital mixer based on the fine carrier frequency offset so as to locate a spectrum of the target channel in a working bandwidth of the digital mixer for acquiring data,
wherein the spectrum computation device comprises:
a Cordic device connected to the digital matched filter (DMF) for receiving the filtered baseband signal and performing a Cordic operation on the filtered baseband signal so as to obtain a phase for each sampling point on the filtered baseband signal;
a 4-times phase device connected to the Cordic device for performing a 4-times phase operation on a signal generated by the Cordic device;
a lagged autocorrelator connected to the DMF for receiving the filtered baseband signal so as to calculate an auto-correlation signal for the filtered baseband signal;
a first multiplexer having a control terminal connected to the controller for receiving a control signal, a first input terminal connected to the DMF for receiving the filtered baseband signal, a second input terminal connected to the 4-times phase device for receiving a signal generated by the 4-times phase device, and a third input terminal connected to the lagged autocorrelator for receiving the autocorrelation signal, and selecting a signal from the first, second or third input terminal for use as an output signal according to the control signal;
an N-point fast Fourier transform (FFT) device connected to the first multiplexer for performing a Fourier transform on the output signal of the first multiplexer;
a bin energy calculator connected to the N-point FFT for calculating an energy at each sampling point in an output signal of the N-point FFT device;

an accumulator connected to the bin energy calculator for accumulating output signals of the bin energy calculator so as to obtain an averaged spectrum;

an equalizer connected to the accumulator for performing an equalization operation on the averaged spectrum; and a second multiplexer having a control terminal connected to the controller for receiving the control signal, a first input terminal and a second input terminal connected to an output terminal of the accumulator, and a third input terminal connected to an output terminal of the equalizer, and selecting a signal from the first, second, or third input terminal for use as an output signal according to the control signal.

10. A device for acquiring a channel with a frequency offset less than half symbol rate in a receiver of a Digital Video Broadcasting-Satellite (DVB-S) system, comprising:

a tuner for receiving a radio frequency (RF) signal of a target channel generated by an antenna and tuning the RF signal down to a baseband based on an analog carrier frequency offset so as to produce an analog baseband signal;

an analog to digital converter (ADC) connected to the tuner for converting the analog baseband signal into a digital baseband signal;

a tuner auto-gain controller (AGC) connected to the ADC and the tuner for tuning a gain of the tuner based on the digital baseband signal;

a digital mixer connected to the ADC for receiving the digital baseband signal and using a digital carrier frequency offset to perform a frequency shifting on the digital baseband signal so as to produce an offset baseband signal;

an interpolator connected to the digital mixer for using a down-sampling factor to perform an interpolation operation on the offset baseband signal so as to produce an interpolated offset baseband signal;

a digital AGC connected to the interpolator for performing an auto-gain adjustment on the interpolated offset baseband signal so as to produce a gained baseband signal;

a digital matched filer (DMF) connected to the digital AGC for filtering the gained baseband signal so as to produce a filtered baseband signal;

a spectrum computation device connected to the digital matched filter for producing a spectrum of the filtered baseband signal;

a spectrum parameter extractor connected to the spectrum computation device for calculating a coarse carrier frequency offset and a fine carrier frequency offset of the spectrum, a coarse symbol rate and a fine symbol rate of the digital baseband signal, and cross points of the spectrum; and a controller connected to the tuner, the digital mixer, the interpolator, the spectrum computation device, and the spectrum parameter extractor for using a carrier frequency of the target channel to calculate the analog carrier frequency offset and generating the analog carrier frequency offset to the tuner, using the symbol rate of the target channel to calculate the down-sampling factor and generating the down-sampling factor to the interpolator, using the coarse carrier frequency offset of the spectrum to re-calculate the analog carrier frequency offset when the coarse carrier frequency offset of the spectrum generated by the spectrum parameter extractor is greater than a first threshold and using the analog carrier frequency offset re-calculated to tune the tuner, using the coarse symbol rate of the digital baseband signal generated by the spectrum parameter extractor and the cross points of the spectrum to calculate the down-sampling factor and generating the down-sampling factor to the interpolator, using the fine carrier frequency offset generated by the spectrum parameter extractor to arrange the digital mixer, and determining whether a signal at the fine carrier frequency offset is a channel to be acquired, wherein, when the signal at the fine carrier frequency offset presents, the controller arranges the digital mixer based on the fine carrier frequency offset so as to locate a spectrum of the target channel in a working bandwidth of the digital mixer for acquiring data, wherein the spectrum parameter extractor comprises:

a first de-multiplexer connected to the spectrum computation device and the controller for generating an output signal of the spectrum computation device through its first, second, or third output terminal according to the control signal generated by the controller;

a moving average device connected to the first output terminal of the first de-multiplexer for performing a moving average operation on the spectrum of the filtered baseband signal generated by the spectrum computation device so as to produce a smooth spectrum;

a cross point search device connected to the moving average device for finding a first cross point and a second cross point of the smooth spectrum crossed with a fourth threshold for output;

an adder connected to the cross point search device for adding the first second cross point and the second cross point;

a divider connected to the adder for dividing an output signal of the adder by two so as to produce the coarse carrier frequency offset;

a subtractor connected to the cross point search device for subtracting the second cross point from the first cross point so as to produce the coarse symbol rate of the digital baseband signal;

a peak detector connected to the second output terminal and the third output terminal of the first de-multiplexer for performing a peak detection on an output spectrum of the spectrum computation device so as to produce a peak location index corresponding to the output spectrum;

a second de-multiplexer connected to the peak detector for selecting its second or third output terminal to generate the peak location index of the peak detector according to the control signal generated by the controller;

a fine carrier frequency offset calculator connected to the second output terminal of the second de-multiplexer for calculating the fine carrier frequency offset according to a peak corresponding to the peak location index; and a fine symbol rate calculator connected to the third output terminal of the second de-multiplexer for calculating the fine symbol rate according to the peak.

* * * * *